United States Patent [19]

Riviere et al.

[11] Patent Number: 5,227,581

[45] Date of Patent: Jul. 13, 1993

[54] HOUSING PROVIDING PROTECTION AGAINST ELECTROMAGNETIC INTERFERENCE FOR AN ELECTRICAL CONNECTION DEVICE

[75] Inventors: Joël Riviere, Longjumeau; Daniel Jamet, Nozay, both of France

[73] Assignee: Alcatel CIT, Paris, France

[21] Appl. No.: 799,345

[22] Filed: Nov. 27, 1991

[30] Foreign Application Priority Data

Nov. 30, 1990 [FR] France ................... 90 15041

[51] Int. Cl.$^5$ ..................... H05K 9/00; H01R 9/00
[52] U.S. Cl. ..................... 174/35 R; 361/424; 361/426
[58] Field of Search ............ 174/35 R, 35 MS; 361/424, 426, 332, 333, 356, 428

[56] References Cited

FOREIGN PATENT DOCUMENTS

| | | |
|---|---|---|
| 0201035 | 12/1986 | European Pat. Off. |
| 0385020 | 9/1990 | European Pat. Off. |
| 985249 | 3/1965 | United Kingdom |
| 2007442 | 5/1979 | United Kingdom |
| 2129630 | 5/1984 | United Kingdom |

OTHER PUBLICATIONS

IBM Technical Disclosure Bulletin, vol. 30, No. 6, Nov. 1987, pp. 76-78, Armonk, N.Y., USA; "Pluggable EMC Shield and Cable Strain Relief System".

Primary Examiner—Leo P. Picard
Assistant Examiner—Bot L. Ledynh
Attorney, Agent, or Firm—Sughrue, Mion, Zinn, Macpeak & Seas

[57] ABSTRACT

A housing provides protection against electromagnetic interference for an electrical connection device adapted to connect at least one first electrical cable provided with a protective screen against electromagnetic interference (EMI) to at least one second electrical cable. It consists of two half-shells made of an EMI-tight material adapted to contain, when assembled together, the connection device connecting the cables. The inside face of a first half-shell is provided with a system for simultaneously ensuring establishment of contact thereof with the screen of the first cable over one part of the outer contour of the screen. The inside face of the second half-shell is provided with members for simultaneously ensuring establishment of contact thereof with the screen of the first cable over the other part of the outer contour of the screen and establishment of pressure of the screen against the first half-shell at the position of establishment of contact thereof with the screen.

14 Claims, 4 Drawing Sheets

HOUSING PROVIDING PROTECTION AGAINST ELECTROMAGNETIC INTERFERENCE FOR AN ELECTRICAL CONNECTION DEVICE

BACKGROUND OF THE INVENTION

1. Field of the Invention

The present invention concerns a housing providing protection against electromagnetic interference for an electrical connection device comprising one or more electrical connection members such as connectors or terminal strips, for example, adapted to interconnect at least two electrical cables at least one of which is provided with a protective screen against electromagnetic interference.

The present invention is applicable in particular to protecting against electromagnetic interference electrical connection members used in telecommunications exchanges to interconnect the equipment racks of such exchanges. These equipment racks are interconnected by means of connectors which connect the equipment to cables known as equipment cables according to a fixed scheme and terminal strips, known as distribution frame terminal strips in this instance, which connect these equipment cables to cables called jumpers which interconnect the distribution frame terminal strips in pairs according to a scheme that can be modified and which produces the required operating configuration of the exchange.

The present invention is applicable in particular to protecting such distribution frame terminal strips against electromagnetic interference.

2. Description of the Prior Art

A distribution frame terminal strip housing is described in French patent application No 2 408 264. The only function of this housing is to contain such terminal strips, however, and it is not designed to protect them against electromagnetic interference, the generation of equipment for which it was developed requiring no such protection.

In more recent telecommunication equipment, subject to more severe electromagnetic interference protection standards, the equipment racks are enclosed to provide protection and the cables incorporate protective screens. It is then important to protect also these electrical connecting members and in particular these distribution frame terminal strips against electromagnetic interference.

An object of the present invention is to provide a housing providing protection against electromagnetic interference for an electrical connection device that is particularly suitable for this type of application.

SUMMARY OF THE INVENTION

The present invention consists in a housing providing protection against electromagnetic interference for an electrical connection device adapted to connect at least one first electrical cable provided with a protective screen against electromagnetic interference (EMI) to at least one second electrical cable, said housing comprising two half-shells made of an EMI-tight material adapted to contain, when assembled together, said connection device connecting said cables and the inside face of a first half-shell being provided with means for simultaneously ensuring establishment of contact thereof with the screen of said first cable over one part of the outer contour of said screen and the inside face of the second half-shell being provided with means for simultaneously ensuring establishment of contact thereof with the screen of said first cable over the other part of the outer contour of said screen and establishment of pressure of said screen against said first half-shell at the position of contact thereof with said screen.

Other objects and features of the present invention will emerge from the following description of one embodiment of a housing in accordance with the invention, this embodiment specifically providing, in the aforementioned application, protection of the connecting members call distribution frame terminal strips, said connecting devices being in this instance in the form of two distribution frame terminal strips, the description being given with reference to the appended drawings.

DETAILED DESCRIPTION OF THE INVENTION

Figure 1:
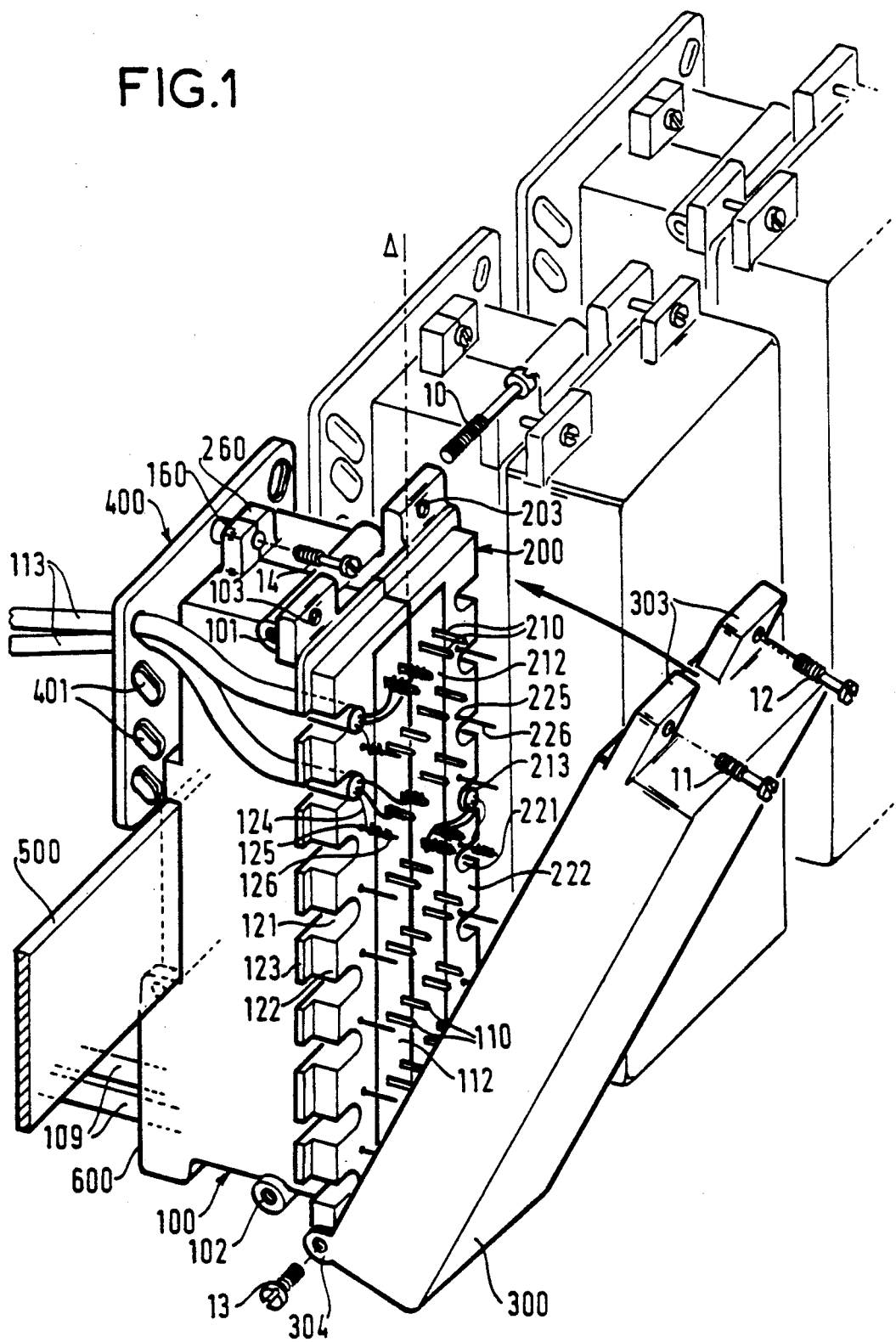
FIG. 1 is a perspective view showing a set of housings in accordance with the invention attached to a support, with one shown partially demounted, with its distribution frame terminal strips fitted, its two half-shells assembled and its cover open.
Figure 2:
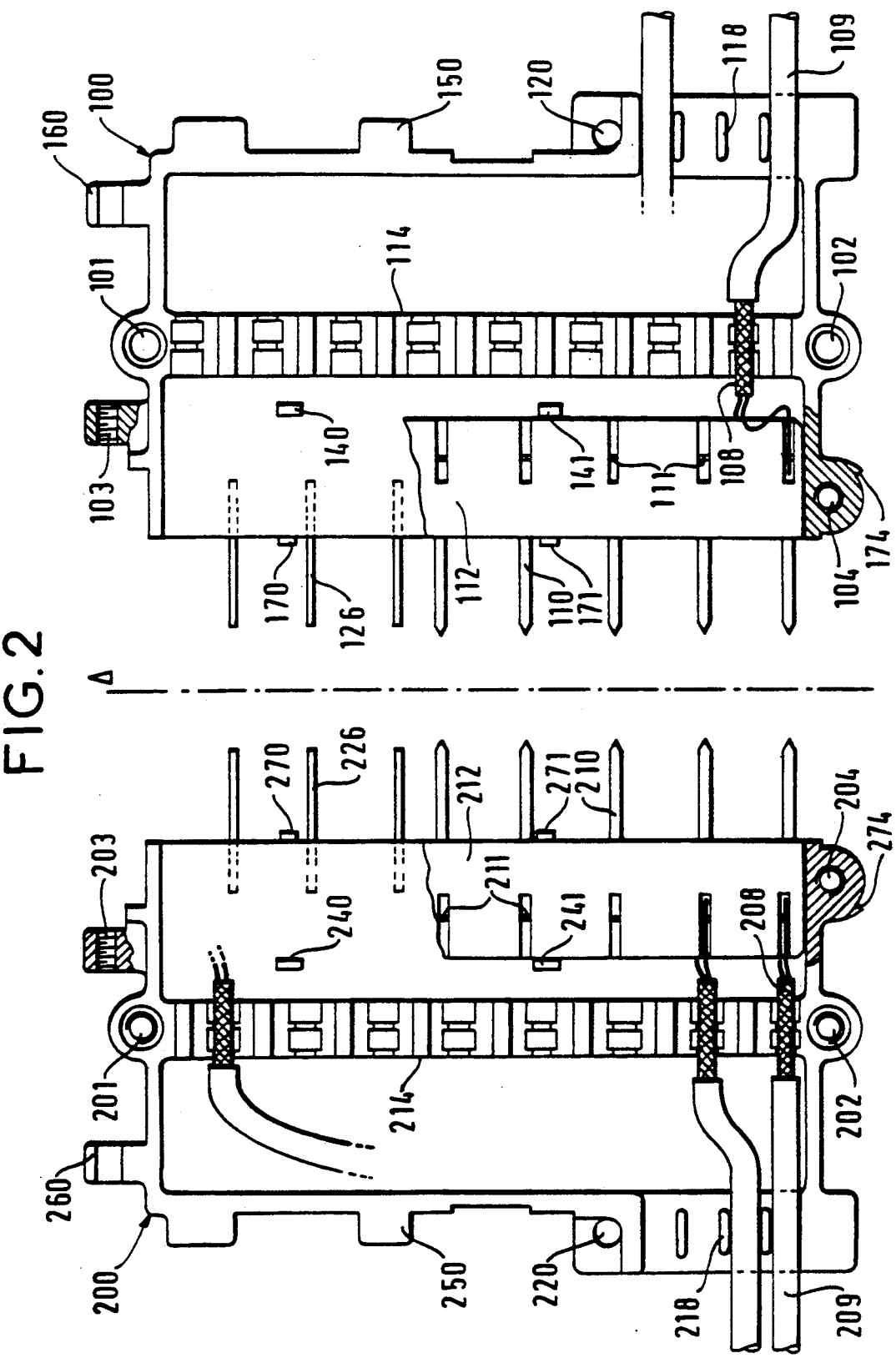
FIG. 2 shows the two half-shells in the non-assembled state in a plan view showing their interior arrangement.

The housing in accordance with the invention shown in the drawings essentially comprises two half-shells 100 and 200 which are shown assembled together in the perspective view in FIG. 1 and disassembled from each other in the plan view in FIG. 2.

The two half-shells are made from a metal that is impermeable to electromagnetic interference and, with one main exception to be explained later, are substantially symmetrical relative to a vertical axis Δ about which, in the position shown in FIG. 2, they are able to pivot to come into contact with each other and form the assembly shown in perspective in FIG. 1.

In the embodiment shown each of the two half-shells is substantially half-parallelepiped-shape open on one side (relative to the perspective view in FIG. 1) designed to come into contact with the other half-shell so that when the two half-shells are assembled together a substantially parallelepiped-shape interior volume is defined adapted to contain, in this example, two distribution frame terminal strips 112, 212 each adapted to connect, in this example, eight equipment cables 109, 209, etc each incorporating a metal braid 108, 208, etc providing protection against electromagnetic interference and eight jumpers 113, 213, etc.

Figure 3:
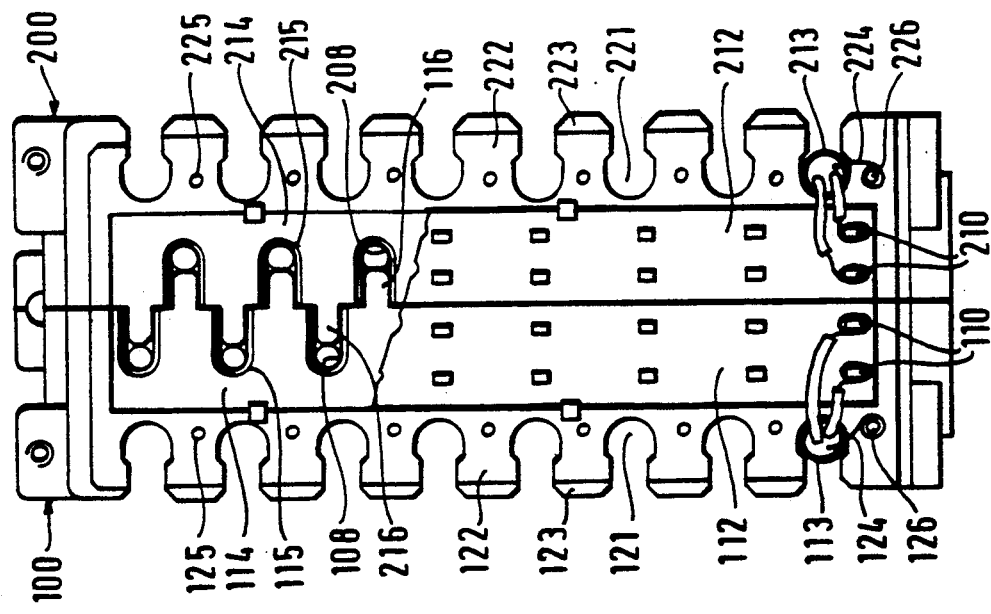
FIG. 3 is a view from the front (relative to the perspective view in FIG. 1) of a housing in accordance with the invention with its distribution frame terminal strips partially cut away to expose a portion of the interior of the assembly and its two assembled half-shells.

In this example, each half-shell is:

provided on its top and bottom surfaces with respective members 101 and 102 and 201, 202 for fixing it, in this instance by means of screws 10, etc, to the other half-shell; in the chosen embodiment, these members are in the form of tubes with screwthreaded interior walls integral with the half-shells and disposed end-to-end in pairs when the latter are joined together, open in a localized area on its rear surface, in this instance in the lower part thereof, to constitute a half-opening forming, when combined with that of the other half-shell symmetrical to it about the axis Δ, an opening for inserting into the housing a bundle of 16 equipment cables 109, 209, etc, open on its front surface to constitute a half-opening forming, when combined with that of the other half-shell symmetrical to it about the axis Δ, an opening providing access, in the configuration shown in FIG. 1, for modifying the interconnection of the jumpers, to the contacts of the distribution frame terminal strips which are connected to these jumpers, without it being necessary to demount the assembly formed by the two assembled together half-shells, the front of the housing apart from these access provisions being then reconstituted by a cover 300 to form a housing impermeable to electromagnetic interference, provided on its top and bottom with respective screwthreaded members 103, 104 and 203, 204 for fixing, in this instance by means of screws 11, 12, 13, etc, the cover 300 to this half-shell, the cover 300 incorporating, facing these screwthreaded members, arrangements 303, 304, etc through which said screws are passed, provided, substantially in the central part of its inside lateral surface, with a respective vertical edge 114, 214 incorporating notches 115, 215, etc separated by lugs 116, 216, etc, the notches and lugs being offset between the two half-shells so that the lugs on one half-shell are in corresponding relationship to the notches on the other half-shell and vice versa once the latter are assembled together, as shown in FIG. 3; note that this offset constitutes the main exception to the symmetrical structure of the two half-shells as mentioned above.

The notches are designed to accommodate the equipment cables 109, 209, etc when their insulative jacket has been removed at the end to expose a short length of their protective screen 108, 208 consisting of a metal braid, for example, so as to establish contact between the screen and the respective half-shell.

The lugs of one half-shell (100, for example) which enter the notches of the other half-shell (200 in this example) are designed to exert pressure on the screens of the cables inserted into the notches of the other half-shell 200 so as to establish a better contact between the cable screens and the half-shell 200 and at the same time to establish contact between the cable screens and the half-shell 100, this being equally valid, of course, on reversing the roles of the two half-shells.

Figure 4:
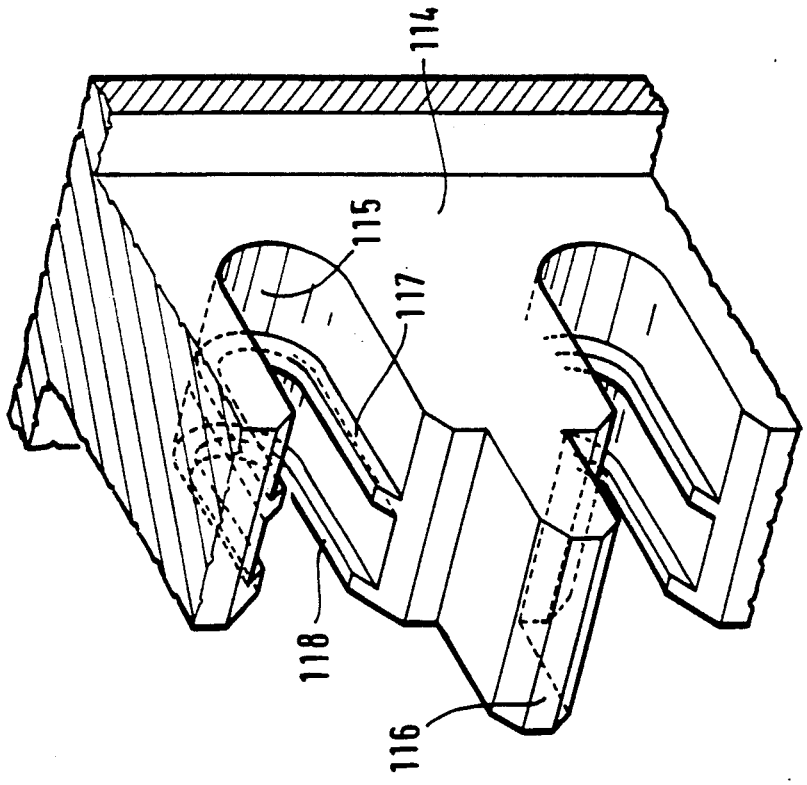
FIG. 4 is a perspective view showing in more detail the shape of the notches and the lugs provided on the inside lateral surface of the half-shells.

FIG. 4 is a perspective view showing in more detail one possible shape for the notches and lugs.

The dimensions of the notches are determined according to the diameter of the screen of the equipment cables to obtain intimate contact between the screens and the half-shell concerned. The notches are advantageously provided, as shown in more detail in FIG. 4 in the case of one of them, in this instance the half-shell 100, with ribs 117, 118, etc for further improving the contact.

Each vertical edge 114, 214 therefore separates the interior volume delimited by the respective half-shell 100, 200 into a rear part in which is fanned out the bundle of equipment cables 109, 209, etc entering in its lower part and each of these cables is routed to one of the notches in the edge in question, and a front part accommodating the terminal strip associated with the half-shell in question. In this front part and on the inside lateral surface of the half-shells and on the front edge of the surface are provided projecting abutments 140, 141, 170, 171, etc and 240, 241, 260, 271, etc which position and retain the terminal strips.

Each of the terminal strips is therefore mounted with its respective contacts 111, 211 connected to the equipment cables facing towards the notches designed to accommodate the equipment cables and with its respective contacts 110, 210 connected to the jumpers facing the front of the half-shell in which the terminal strip is mounted. The contacts connected to the equipment cables are in this instance insulation displacement contacts and the contacts connected to the jumpers are wire-wrap contact.

Access to and retention of the jumpers 113, 213, etc (FIGS. 1 and 3) to the housing when the cover 300 is closed is provided in this embodiment by a set of crenellations provided at the front of the outside lateral surface of each half-shell and designed, as shown in FIG. 1, to guide the jumpers towards the rear. To this end the jumpers are inserted into the gaps 121, 221, etc of these crenellations. The solid part of the crenellations 122, 222, etc has a step 123, 223, etc facing towards the outside of the respective half-shell, the set of these steps providing a multi-contact abutment for the cover 300 on the half-shell in question.

On the side facing towards the interior of the half-shell the solid part of the crenellations comprises holes 125, 225, etc (visible in FIG. 3) adapted to receive pins 126, 226, etc (visible in FIG. 1) designed to provide the electrical connection between the jumper screens and the half-shell in question, the connection being made in this example by means of a metal wire 124, 224, etc twisted around said screen along the entire length of the jumper to which access is gained when the jumpers are stripped and which can be connected to the pins 126, 226, etc by wire-wrap connections.

Figure 6:
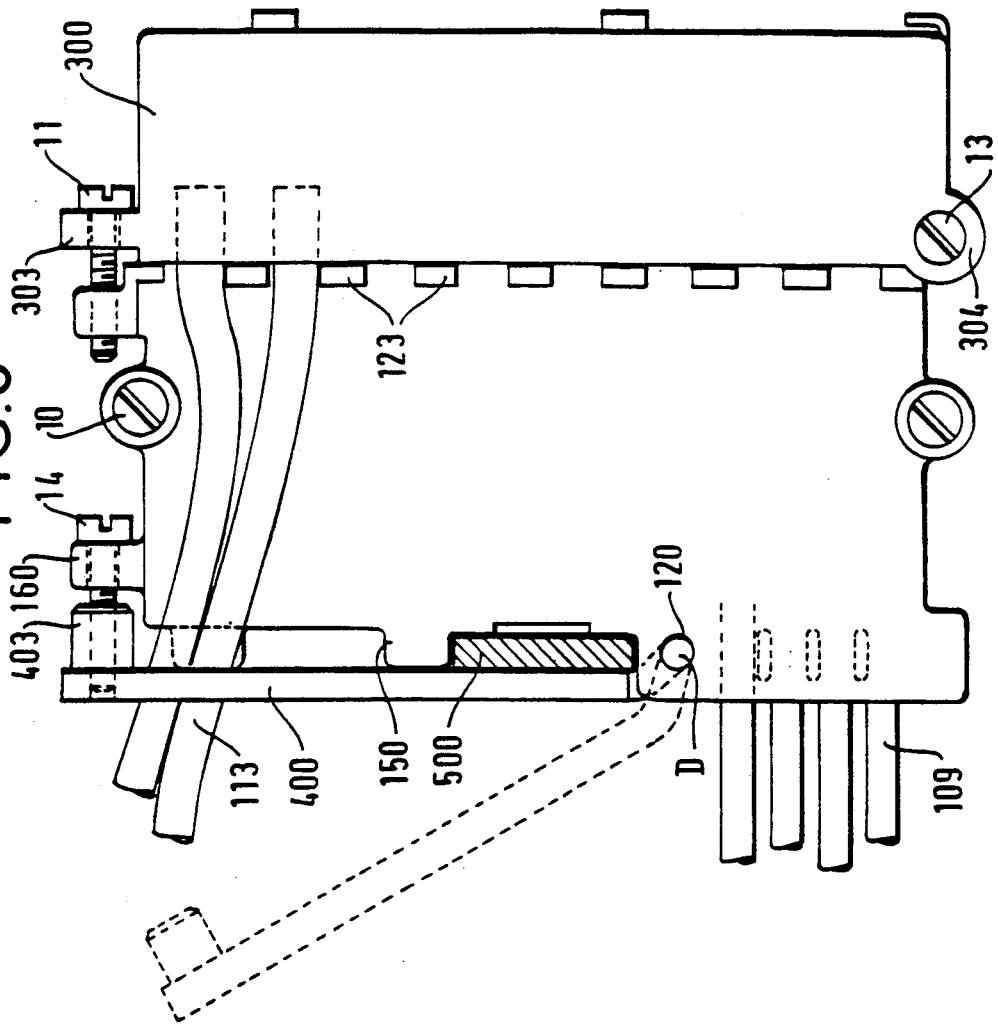
FIG. 6 is a side view (relative to the perspective view in FIG. 1) of an assembled housing in accordance with the invention attached to a support.
Figure 5:
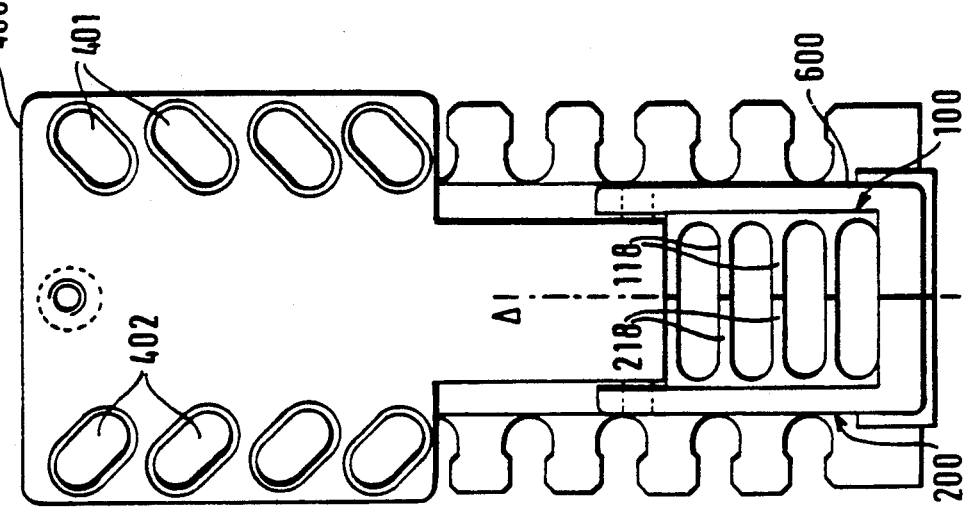
FIG. 5 is a rear view (relative to the perspective view in FIG. 1) of a housing in accordance with the invention with its two half-shells assembled together and provided with a clamp for fixing it to a support.

As seen more clearly in FIGS. 5 and 6, the rear, side and bottom surfaces of the half-shells have a profile at the aperture for inserting the equipment cables designed to create, when the two half-shells are assembled together, a passage 600 terminating at said opening and providing horizontal guidance of the bundle of 16 equipment cables when it is inserted into the housing.

Horizontal ribs 118, 218, etc on each respective half-shell are additionally provided in this passage to enable orderly insertion of the equipment cables, in this instance four cables in each inter-rib gap, i.e. two for each half-shell, and additionally to improve the sealing of the housing against electromagnetic interference at this passage.

The passage, integrated into the two half-shells and projecting from the lower part of their rear surface, is also of substantially parallelepiped shape and has its side and bottom surfaces (relative to the perspective view in FIG. 1) formed by extending the side and bottom surfaces of the half-shells. Its top surface is at 90° to the rear surface of the half-shells.

Its side surfaces extend slightly above its top surface to create respective orifices 120, 220 for inserting a horizontal pivot pin (D) for a clamp 400 for fixing the housing to a support bar 500, such pivoting enabling removal of the housing from its support bar without having to detach it from its fixing clamp.

The fixing clamp 400 has in its lower part (see FIG. 6) an angled portion in which it is pivoted and which locks the support bar 500 into the space thus made available between the clamp, the top surface of the equipment cable passage and the rear surfaces of the two assembled half-shells, at least in that part of these rear surfaces below a projection whose location depends on the height of the support bar, said projection being formed by the combination of two half-protections 150, 250 provided symmetrically on the two half-shells.

The fixing clamp 400 is wider in its upper part in which it comprises, on each side of its vertical axis of symmetry Δ, a row of slots 401, 402, etc through which the jumpers leaving the housing are passed in an orderly manner.

In its upper part on the axis of symmetry Δ the fixing clamp 400 is further provided with a screwthreaded spacer 403 for fixing it, in this instance by means of a screw 14, to the housing, to be more precise to a lug with a hole in the middle on the housing and obtained by the combination of two members 160, 260 provided symmetrically towards the rear of the top surface of each of the half-shells.

Two screws 13 are advantageously employed to fix the cover to the members 104 and 204, only that fixing the cover to the member 104 being visible in the figures.

To facilitate use of the housing in telecommunication exchanges the cover 300 is advantageously designed to pivot 120° about its fixing screws 13 which, once loosened, serve as pivot pins. On such pivoting it comes into contact with two projecting abutments 174, 274 provided for this purpose at the periphery of the members 104, 204 (see FIG. 2). These arrangements provide access to the pins 126, 226 without it being necessary to separate the cover completely from the two assembled half-shells.

Although in practise this is of less significance, the vertical edge of the central part of the inside lateral surface of each half-shell could advantageously comprise notches and lugs differing in number from one half-shell to the other. The lugs and notches on the edge of each half-shell being however equal in number to those of the other half-shell to enable the placing in corresponding relationship of the lugs of one half-shell with the notches of the other and vice versa when the two half-shells are assembled together.

Although also less beneficial in practise, it would also be feasible to distinguish the function of the two half-shells by providing the vertical edge of one of them only with notches and that of the other only with lugs, such differentiation being more beneficial in the case of an application where only a single pair of cables is to be connected one to the other, a single notch-lug combination being then necessary.

Also, it would be feasible for the notches to have a depth slightly less than the diameter of the cables complete with their screen, which would make it possible to dispense with the lugs in corresponding relationship with the notches which could be beneficial from the economic point of view. The means of establishing contact between the cable screen and the first half-shell would then still comprise a notch but a notch having a depth less than that in the embodiment described above and the means of pressing the cable screen against the first half-shell and establishing contact of the cable screen with the second half-shell would be reduced to a flat part in corresponding relationship to said notch.

There is claimed:

1. A combined protection housing and electrical connection device, said housing providing protection against electromagnetic interference for said electrical connection device, said electrical connection device adapted to connect at least one first electrical cable provided with a protective screen against electromagnetic interference (EMI) to at least one second electrical cable, said housing comprising two half-shells made of an EMI-tight material and containing, when assembled together, said connection device connecting said cables, and an inside face of a first half-shell being provided with means for simultaneously ensuring establishment of contact thereof with said screen of said first cable over one part of an outer contour of said screen and an inside face of the second half-shell being provided with means for simultaneously ensuring contact thereof with said screen of said first cable over another part of said outer contour of said screen and for establishment of pressure of said screen against said first half-shell at the position of contact thereof with said screen.

2. A combined protective housing and electrical connection device according to claim 1 wherein said means for establishing contact between said screen and said first half-shell includes a notch formed in a projecting edge provided on an internal face of said half-shell and having a width matching the diameter of said screen.

3. A combined protective housing and electrical connection device according to claim 2 wherein said means for establishing pressure and contact of said screen with said second half-shell consist of a lug formed in a projecting edge on said internal face of said half-shell facing said notch and penetrating thereinto with the two half-shells assembled.

4. A combined protective housing and electrical connection device according to claim 3 wherein said electrical connection device connects a plurality of first cables to a plurality of second cables wherein each half-shell includes a row of notches in said projecting edge separated by lugs, the rows of notches and lugs of the two half-shells being mutually disposed whereby the lugs of each half-shell face and penetrate into the notches of the other half-shell upon assembly, said notches within each of said half-shells constituting an equivalent number of means for establishing said contact of the screen of said first cable with said half-shell and the lugs within each of said half-shells constituting an equivalent number of means for establishing pressure and contact with the screen of further first cables with said half-shell.

5. A combined protective housing and electrical connection device according to claim 1 wherein said at least one second cable is also provided with a screen providing protection against electromagnetic interference and at least one of the two half-shells is provided with means for establishing electrical connection of said second cable screen with said one half-shell.

6. A combined protective housing and electrical connection device according to claim 5 wherein said second cable screen includes a twisted metal wire, and said means for establishing electrical connection comprise at least one hole formed in at least one of said half-shells receiving a terminal for connection to one of said twisted metal wires.

7. A combined protective housing and electrical connection device according to claim 1 wherein each half-shell has a half-opening which together with a corresponding half-opening of the other half-shell constitutes an opening giving access to at least one contact of said electrical connection device connected to said at least one second cable and said housing further includes a detachable cover sealing said opening.

8. A combined protective housing and electrical connection device according to claim 7 wherein access of said at least one second cable to said housing is obtained by means of a row of crenellations provided on an outer face of at least one of said half-shells, and wherein a solid portion of said crenellations come into contact with said cover when said cover is closed and wherein gaps therein guide said at least one second cable towards the outside of the housing.

9. A combined protective housing and electrical connection device according to claim 6 wherein access of said at least one second cable to said housing is obtained by means of a row of crenellations provided on an outer face of at least one of said half-shells, a solid portion of said crenellations come into contact with said cover when the cover is closed and gaps therein guide said at least one second cable towards the outside of the housing, and wherein said holes are formed in the solid portion of said crenellations.

10. A combined protective housing and electrical connection device according to claim 1 wherein each half-shell has a half-opening forming together with the half-opening of the other half-shell an opening for insertion of said at least one first cable into said housing.

11. A combined protective housing and electrical connection device according to claim 10 wherein said opening is extended by a passage guiding said at least one first cable upon insertion thereof into the housing.

12. A combined protective housing and electrical connection device according to claim 11 wherein said passage is fitted with ribs capable of separating multiple cables.

13. A combined protective housing and electrical connection device according to claim 1 further comprising a clamp mounted to said half-shells for fixing said half-shells to a support.

14. A combined protective housing and electrical connection device according to claim 13 wherein said clamp includes a part that intercepts a path of said at least one second cable accessing said housing and is provided in said part with at least one opening allowing orderly passage of said at least one cable.

* * * * *